United States Patent
Adoni et al.

(10) Patent No.: US 10,636,054 B2
(45) Date of Patent: Apr. 28, 2020

(54) CONTINUING PLAYBACK OF ADVERTISEMENTS ACROSS MULTIPLE DEVICES BASED ON MONITORING USER ACTIVE VIEWING DURATION

(71) Applicant: INTERNATIONAL BUSINESS MACHINES CORPORATION, Armonk, NY (US)

(72) Inventors: Siddique M. Adoni, Bangalore (IN); Gregory J. Boss, Saginaw, MI (US); Norbert Herman, Denver, CO (US); Shubhadip Ray, Secaucus, NJ (US); Dhandapani Shanmugam, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 643 days.

(21) Appl. No.: 15/363,492

(22) Filed: Nov. 29, 2016

(65) Prior Publication Data

US 2018/0150871 A1    May 31, 2018

(51) Int. Cl.
*G06Q 30/02*    (2012.01)
(52) U.S. Cl.
CPC ..... *G06Q 30/0246* (2013.01); *G06Q 30/0251* (2013.01)
(58) Field of Classification Search
None
See application file for complete search history.

(56) References Cited

U.S. PATENT DOCUMENTS

| | | | |
|---|---|---|---|
| 2002/0046087 A1 | 4/2002 | Hey | |
| 2003/0046158 A1* | 3/2003 | Kratky | G06Q 30/02 705/14.58 |
| 2003/0083931 A1 | 5/2003 | Lang | |

(Continued)

FOREIGN PATENT DOCUMENTS

| | | |
|---|---|---|
| CN | 103279882 | 9/2013 |
| WO | 2009014843 | 1/2009 |

OTHER PUBLICATIONS

Yun JK., Jang JH., Park KR., Han DW. (2009) Real-Sense Media Representation Technology Using Multiple Devices Synchronization. In: Lee S., Narasimhan P. (eds) Software Technologies for Embedded and Ubiquitous Systems. SEUS 2009. Lecture Notes in Computer Science, vol. 5860. Springer, Berlin, Heidelberg (Year: 2009).*

(Continued)

*Primary Examiner* — William A Brandenburg
*Assistant Examiner* — Christopher C Busch
(74) *Attorney, Agent, or Firm* — Brian Restauro; Andrew D. Wright; Roberts Mlotkowski Safran Cole & Calderon, P.C.

(57) ABSTRACT

A computer-implemented method comprising: presenting, by a computing device, an advertisement on a first device; monitoring, by the computing device, viewing activity by a user of the advertisement, wherein the monitoring comprises tracking an amount of time that the user actively views the advertisement on the first device; and continuing, by the computing device, playback of the advertisement on one or more second devices until the user has actively viewed the advertisement for a target impression time based on the monitoring.

20 Claims, 9 Drawing Sheets

(56) References Cited

U.S. PATENT DOCUMENTS

| | | | |
|---|---|---|---|
| 2009/0125343 A1 | 5/2009 | Cradick | |
| 2010/0057558 A1* | 3/2010 | Yano | G06K 9/325 |
| | | | 705/14.45 |
| 2013/0091019 A1* | 4/2013 | Mallon | G06Q 30/0251 |
| | | | 705/14.68 |
| 2013/0191226 A1 | 7/2013 | Smallwood et al. | |
| 2013/0326554 A1* | 12/2013 | Shkedi | H04N 21/812 |
| | | | 725/34 |
| 2014/0095320 A1 | 4/2014 | Sivaramakrishnan et al. | |
| 2014/0236728 A1 | 8/2014 | Wright | |
| 2014/0236737 A1 | 8/2014 | Rowe | |
| 2015/0127460 A1 | 5/2015 | Daub et al. | |
| 2015/0235275 A1 | 8/2015 | Shah et al. | |
| 2015/0309566 A1* | 10/2015 | Hampiholi | G06F 3/013 |
| | | | 345/156 |
| 2015/0363823 A1 | 12/2015 | Placentra, II et al. | |
| 2017/0085962 A1* | 3/2017 | Maughan | H04N 21/812 |

OTHER PUBLICATIONS

"Cross-Device Sequential Messaging", Crosswise, http://www.crosswise.com, Feb. 7, 2016, 4 pages.

"Media Kit—Personalize the Internet for Today's Cross-Device Consumers", https://d2ehj18o7gdun7.cloudfront.net/production/original/38663.DB_MediaKit_June2016.pdf?1467217482, Drawbridge, Accessed Nov. 29, 2016, 12 pages.

White Paper, "Cross-Device Consumer Graph—Enabling Brands to Have Seamless Conversations With Consumers Across Devices", : https://gallery.mailchimp.com/dd5380a49beb13eb00838c7e2/files/DB_White_Paper_May2016.pdf, Drawbridge, Accessed Nov. 29, 2016, 12 pages.

Technology, "We're Building the People Tech That Maps the Cross-Device World", https://drawbridge.com/technology, Accessed Nov. 29, 2016, 3 pages.

Measuring Cross-Device, The Methodology, TAPAD, http://www.tapad.com/resources/cross-device/measuring-cross-device-the-methodology, Accessed Nov. 29, 2016, 5 pages.

Mell et al., "The NIST Definition of Cloud Computing", NIST, Special Publication 800-145, Sep. 2011, 7 pages.

\* cited by examiner

CONTINUING PLAYBACK OF ADVERTISEMENTS ACROSS MULTIPLE DEVICES BASED ON MONITORING USER ACTIVE VIEWING DURATION

BACKGROUND

The present invention generally relates to controlling playback/display of advertisements across multiple devices and, more particularly, to controlling playback of advertisements across multiple devices based on monitoring user viewing of advertisements.

Advertising firms sometimes sell advertisements ("ads") based on the number of "impressions" that an advertisement is expected to have. For example, a client may pay a particular fee for an advertisement that will be viewed at a certain number of times. Each impression is typically measured by a viewer viewing the advertisement. Advertisements are often disseminated via electronic devices, such as smartphones, tablet devices, laptop computers, desktop computers, electronic billboards, etc.

SUMMARY

In an aspect of the invention, a computer-implemented method includes: presenting, by a computing device, an advertisement on a first device; monitoring, by the computing device, viewing activity by a user of the advertisement, wherein the monitoring comprises tracking the amount of time that the user actively views the advertisement on the first device; and continuing, by the computing device, playback of the advertisement on one or more second devices until the user has actively viewed the advertisement for a target impression time based on the monitoring.

In an aspect of the invention, there is a computer program product for playing back an advertisement for a user across a plurality of devices. The computer program product includes a computer readable storage medium having program instructions embodied therewith, the program instructions executable by a computing device to cause the computing device to: present an advertisement on a first device to a user; determine a first time index corresponding to when the user begins actively viewing the advertisement on the first device; determine a second time index corresponding to when the user discontinues actively viewing the advertisement on the first device; determine a viewing time corresponding to a duration of time between when first time index and the second time index; and continue playback of the advertisement on a second device based on determining that the viewing time is less than the target impression time.

In an aspect of the invention, a system comprising: a CPU, a computer readable memory and a computer readable storage medium associated with a computing device; program instructions to present an advertisement on a first device; program instructions to determine a first viewed duration of time in which a user has actively viewed the advertisement on the first device; program instructions to present the advertisement on a second device based on the first time period being less than an impression target time; program instructions to track a second viewed duration of time in which a user has actively viewed the advertisement on the second device; and program instructions to present the advertisement on a third device based on a sum of the first view duration of time and the second viewed duration of time being less than the impression target time. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
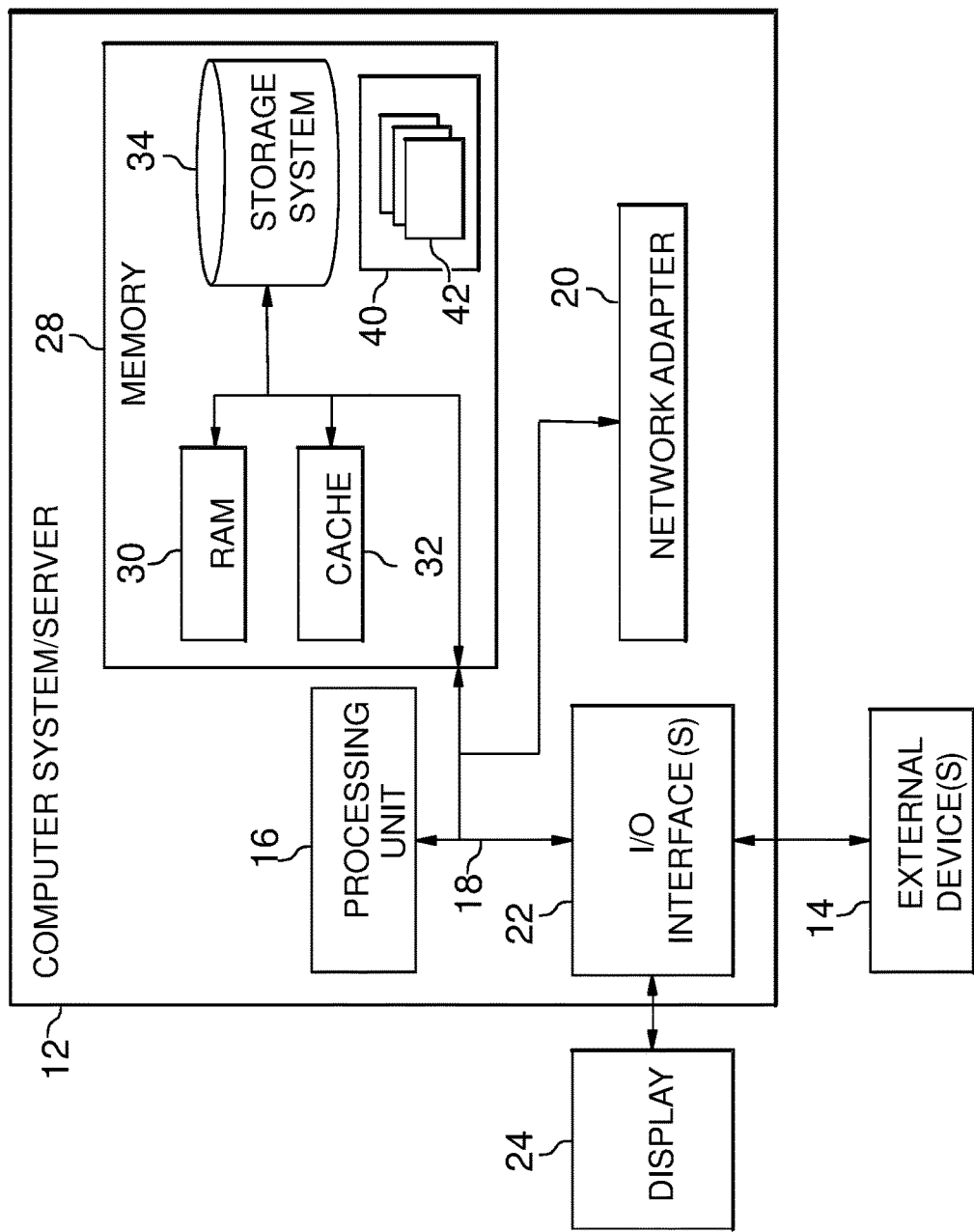
FIG. 1 depicts a cloud computing node according to an embodiment of the present invention.

The present invention generally relates to controlling playback of advertisements across multiple devices and, more particularly, to controlling playback of advertisements across multiple devices based on monitoring user viewing of advertisements. The length of the time a viewer views an advertisement is typically not accounted for, but is a valuable metric when tracking the effectiveness of the advertisement and ensuring that each viewer would have an "impression" for a given length of time. Accordingly, aspects of the present invention may determine when a user is viewing an advertisement (e.g., actually looking at and paying attention to the advertisement), determine when the user has stopped viewing the advertisement (even if playback of the advertisement continues), and track the duration that the user has viewed the advertisement. Further, aspects of the present invention may continue to play an advertisement until a target impression time has been satisfied (e.g., until the user has viewed the advertisement for a target threshold period of time). Additionally, or alternatively, aspects of the present invention may play back different portions of an advertisement on different devices such that the advertisement "follows" the user (e.g., by tracking the viewing duration of the advertisement and continuing playback of the advertisement until the target impression time has been satisfied). For example, one portion of an advertisement may be played on an electronic billboard during a user's drive whereas a later portion of the advertisement may be played on a user's private user device at a later time. As described herein, the order of devices for playing ads to a user may be based on the presence of the user to the proximity of the device and/or a user's travel path.

As described herein, user presence and activity sensors may be used to determine a user's presence in relation to the proximity of an advertisement playback device (e.g., an electronic billboard, such as an Internet of Things (IoT) enabled billboard). Additionally, or alternatively, the user presence and activity sensors may be used to determine the user's attention to an advertisement while the advertisement is being played. For example, the user presence and activity sensors may report data representing the user's field of view, conversation activity, device usage activity, and/or other general user activity that may indicate whether or not the user is viewing at an advertisement and actively paying attention to the advertisement. As an illustrative example, the user presence and activity sensors may report data indicating a direction in which the user is facing, user speech, etc. As described herein, the user presence and activity sensors may be Internet of Things (IoT) sensors and may be implemented in vehicles, buildings, billboards, etc. Additionally, or alternatively, the user presence and activity sensors may communicate with user devices, such as smartphones, tablets, smart appliances, etc. As described herein, the user presence and activity sensors may include a suite of sensors, cameras, microphones, communications hardware, etc. that are capable of capturing information indicative of user activity, including, for example, user field of view, user conversation activity, user device utilization, etc.

As described herein, an application server may communicate with the user presence and activity sensors to determine a user's presence in relation to an advertisement playback device, monitor a duration for which the user actively views an advertisement, and continue playing the advertisement for the user until a target threshold time is met. The application server may continue playing the advertisement on either a public advertisement device (e.g., on a billboard, or the like) or a private user device depending on the user's travel path. In this way, an advertisement may "follow" the user such that the advertisement is played until a target threshold time is met (e.g., until the user has actively viewed the advertisement for a threshold amount of time).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
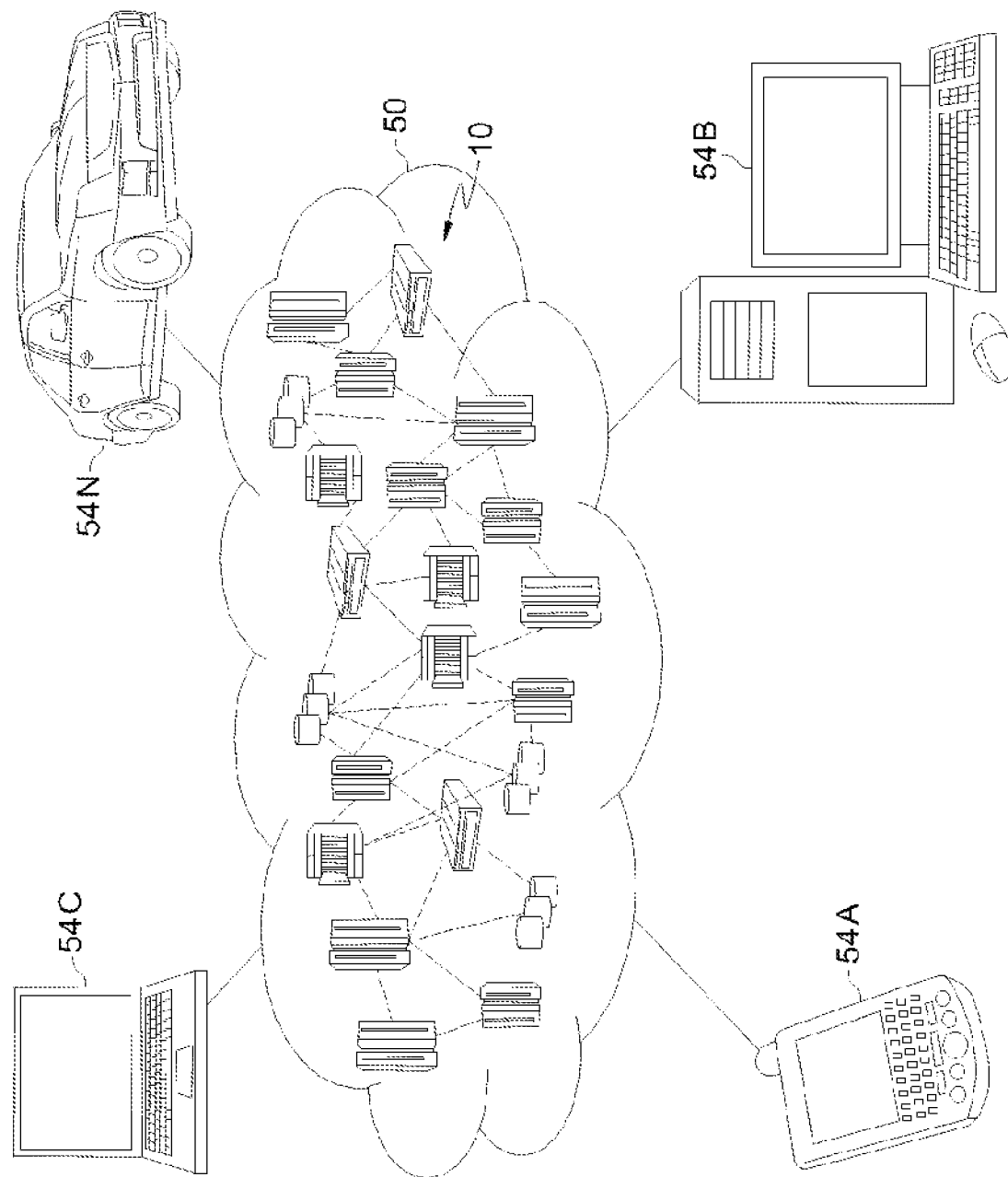
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
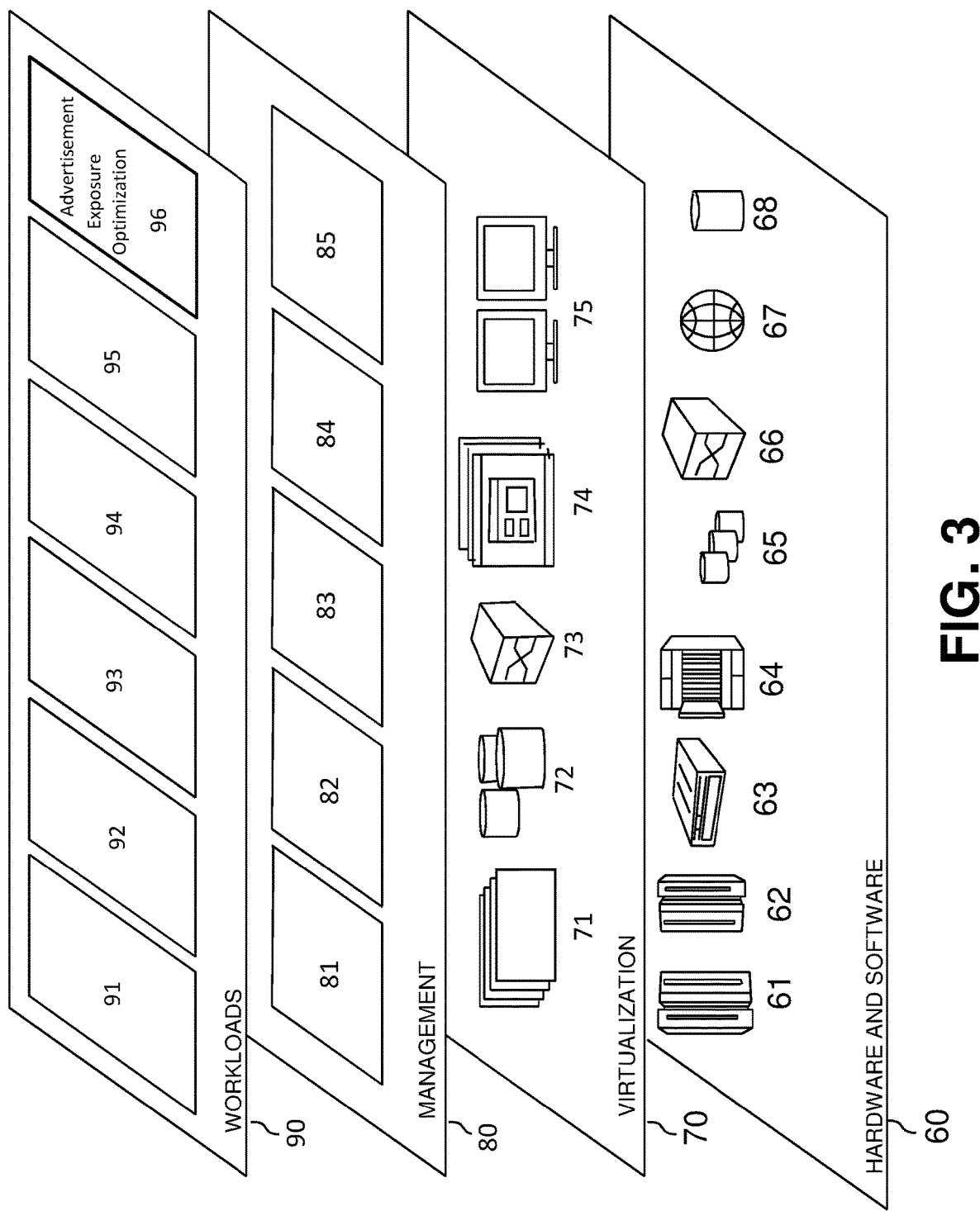
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and advertisement exposure optimization 96.

Referring back to FIG. 1, the program/utility 40 may include one or more program modules 42 that generally carry out the functions and/or methodologies of embodiments of the invention as described herein (e.g., such as the functionality provided by advertisement exposure optimization 96). Specifically, the program modules 42 may receive user activity data from user presence and activity sensors, determine a duration of time for which a user is actively viewing an advertisement based on the user activity data, and continue playback the advertisement on other devices until the user has actively viewed the advertisement for a target threshold period of time (e.g., a target impression time). Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of an advertisement playback and management device 240 as shown in FIG. 4.

Figure 4A:
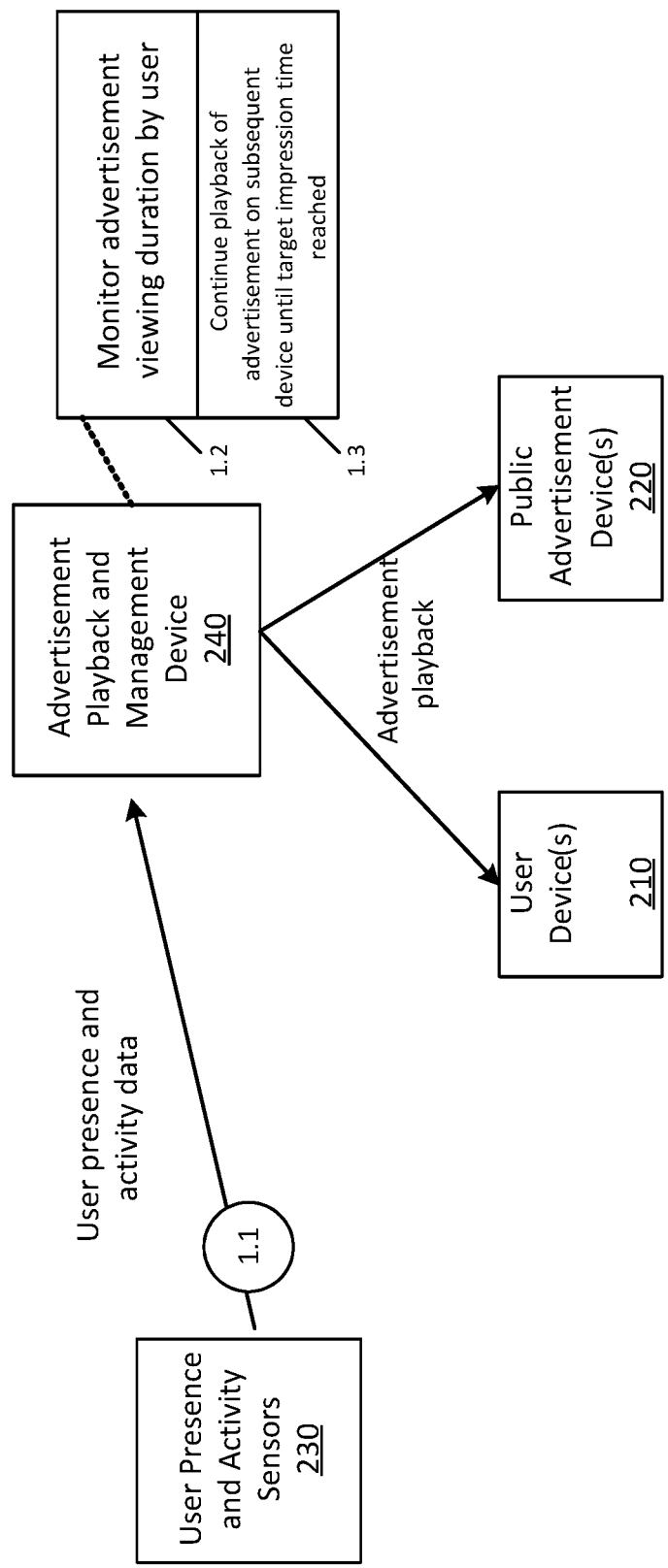
FIGS. 4A and 4B show an overview of an example implementation in accordance with aspects of the present invention.
Figure 4B:
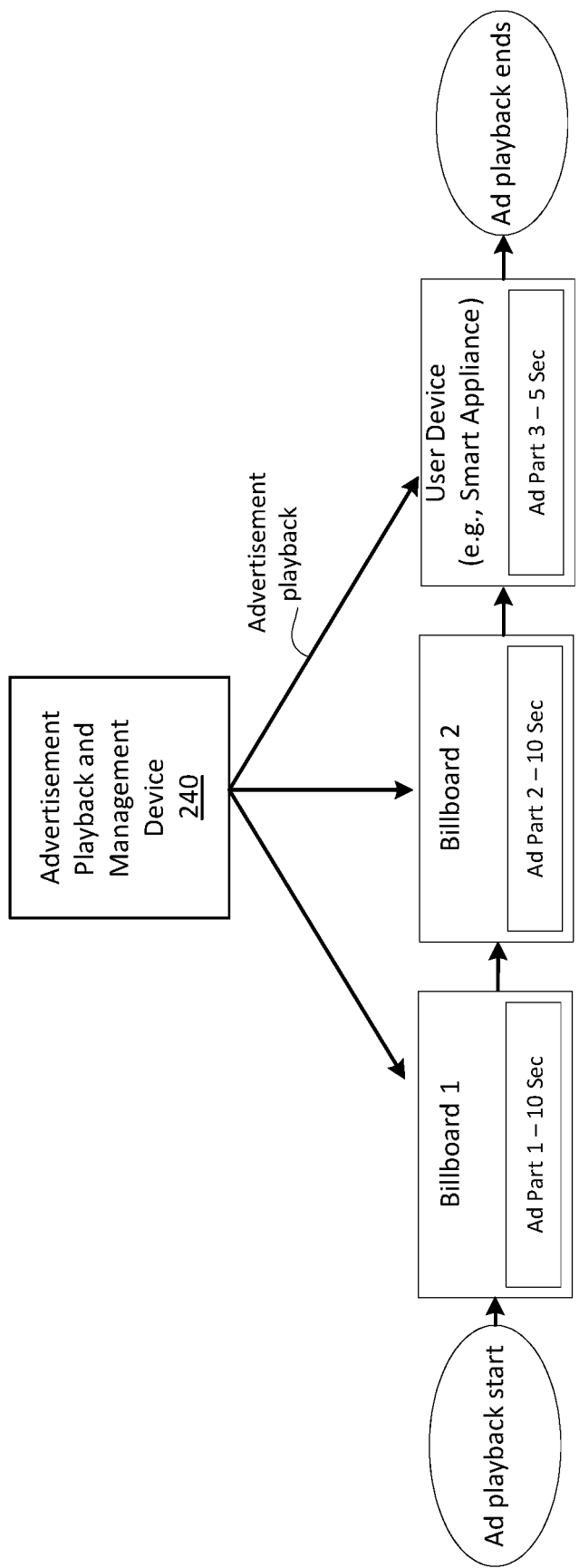

FIGS. 4A and 4B show an overview of an example implementation in accordance with aspects of the present invention. As shown in FIG. 4A, an advertisement playback and management device 240 may receive user presence and activity data from user presence and activity sensor 230 for a user (at step 1.1). For example, the advertisement playback and management device 240 may receive user presence and activity data in conjunction with the playback of advertisement (e.g., on a public advertisement device 220, such as a roadside billboard, a billboard at a shopping mall, etc.). As an example, the user presence and activity sensors 230 may be implemented within vehicles, roadside utility poles, stationary billboards, etc. that are capable of capturing user presence and activity data.

The user presence and activity data may include information representing the user's attention and viewership of the advertisement. For example, the user presence and activity data may identify the user's field of view, conversation activity, device usage activity, and/or other general user activity that may indicate whether or not the user is viewing at an advertisement and actively paying attention to the advertisement.

At step 1.2, the advertisement playback and management device 240 may monitor user viewing duration of the advertisement. For example, the advertisement playback and management device 240 may identify and monitor time periods for when the user is actively viewing the advertisement (e.g., based on the user's field of view, conversation activity, user device actively, and/or other user activity as indicated by the user presence and activity data). As an example, the advertisement playback and management device 240 may identify that a user is actively viewing the advertisement when the advertisement is within the user's field of view, when the user is not actively using another device, when the user is not in a conversation, when the user is a passenger in the vehicle rather than the driver (or when the user is a driver but is stopped at a traffic light), etc. Based on the monitoring, the advertisement playback and management device 240 may detect when the user has discontinued actively viewing the advertisement, and may record a duration for which the user has actively viewed the advertisement.

At step 1.3, the advertisement playback and management device 240 may continue playback of the advertisement on subsequent devices (e.g., private user devices 210 and/or other public advertisement devices 220) until a target impression time has been reached. That is, the advertisement playback and management device 240 may continue to monitor the user viewership duration as the advertisement is played back on subsequent devices. Further, the advertisement playback and management device 240 may select devices for which to continue playback of the advertisement based on a predicted travel path of the user (e.g., as determined based on the user's vehicle guidance system, and/or similar type of information). Additionally, or alternatively, the advertisement playback and management device 240 may continue playback of the advertisement at a device when the user is present at that device.

As an illustrative example, and referring to FIG. 4B, the advertisement playback and management device 240 may initially play part one of an advertisement on a first billboard ("Billboard 1") for ten seconds (e.g., when the user views the advertisement at a traffic light). The advertisement playback and management device 240 may detect that user discontinues viewing the advertisement (e.g., when the traffic light turns green and the user begins to drive), and may play part two of the advertisement on a second billboard ("Billboard 2") for ten seconds (e.g., when the user reaches another traffic light). The advertisement playback and management device 240 may detect that the user discontinues viewing the advertisement (e.g., when the user again begins to drive), and may play part three of the advertisement on a user device 210 (e.g., a smart appliance) for five seconds (e.g., when the user arrives at their home). As described herein, the advertisement playback and management device 240 may select the devices on which to play the advertisement based on a user's predicted travel path. Also, the advertisement playback and management device 240 may continue to play back the advertisement until an active viewing duration has satisfied a target impression time. In this way, the effectiveness of an advertisement is improved, as the advertisement playback and management device 240 ensures that the advertisement is played until the user has actively viewed the advertisement for a target impression time.

As described herein, the advertisement playback and management device 240 may perform additional tasks relating to the selection of an advertisement to play. For example, if multiple users are located within a proximity of a public advertisement device 220, the advertisement playback and management device 240 may select an advertisement to play on the public advertisement device 220 based on a cumulative interest of multiple users, or based on the most popular topics of interest amongst the group of users. Additionally, or alternatively, the advertisement playback and management device 240 may determine individual target impression times for different users based on the individual interest level of the users to a selected advertisement (e.g., based on the user's attention to an initial portion of the advertisement and/or based on user profile information indicating a level of interest of the advertisement).

Figure 5:
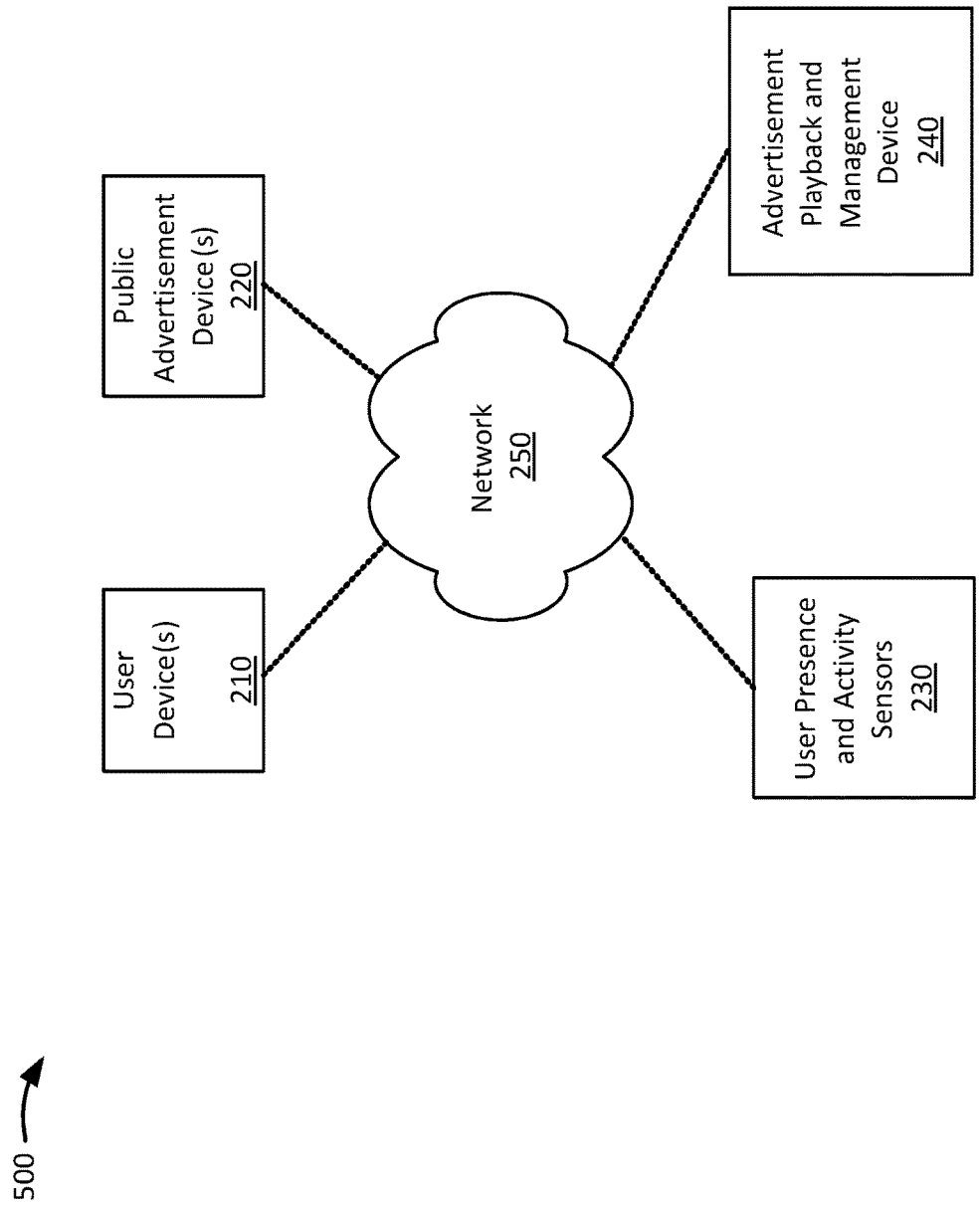
FIG. 5 shows an example environment in accordance with aspects of the present invention.

FIG. 5 shows an example environment in accordance with aspects of the present invention. As shown in FIG. 5, environment 500 may include user devices 210, public advertisement device 220, user presence and activity sensors 230, advertisement playback and management device 240, and network 250. In embodiments, one or more components in environment 500 may correspond to one or more components in the cloud computing environment of FIG. 2. In embodiments, one or more components in environment 500 may include the components of computer system/server 12 of FIG. 1.

The user device 210 may include a computing device capable of communicating via a network, such as the network 250. For example, the user device 210 may correspond to a mobile communication device (e.g., a smart phone or a personal digital assistant (PDA)), a portable computer device (e.g., a laptop or a tablet computer), a desktop computing device, a smart television, a smart appliance (e.g., a network-enabled refrigerator, or the like), a vehicle media/navigation/display unit, and/or another type of computing device. In some embodiments, the user device 210 may be a private device associated with a particular user via which advertisements may be provided for playback to the user. In embodiments, user device 210 may communicate with the user presence and activity sensor 230 to provide user device activity to the user presence and activity sensors 230.

The public advertisement device 220 may include an electronic display that is provided in a public area. In embodiments, the public advertisement device 220 may be a roadside billboard, a stationary billboard in a public facility (e.g., a merchant facility, mall, bus stop, etc.). The public advertisement device 220 may receive an advertisement for display from the advertisement playback and management device 240.

The user presence and activity sensors 230 may include a suite of sensors, cameras, microphones, communications hardware, etc., that are capable of capturing information indicative of user activity, including, for example, user field of view, user conversation activity, user device utilization, etc. In embodiments, user presence and activity sensors 230 may be implemented in a public advertisement device 220 to detect the presence of a user device 210 in relation to the proximity of the public advertisement device 220 (e.g., such that the advertisement playback and management device 240 may play an advertisement on the public advertisement device 220 based on the presence of the user device 210). For example, the user presence and activity sensors 230 may detect the presence of a user device 210 based on discovery signals provided by the user device 210 (e.g., Bluetooth signals, WiFi signals, etc.) In embodiments, the user presence and activity sensors 230 may include beacons that emit signals such that user device 210 may detect the user presence and activity sensors 230. Based on detecting user presence and activity sensors 230, the user device 210 provides user information to the user presence and activity sensors 230 identifying a user. Additionally, or alternatively, the user device 210 may provide user information and the user's location to the advertisement playback and management device 240 based on detecting the presence of the user presence and activity sensors 230.

The advertisement playback and management device 240 may include one or more server devices (e.g., computer system/server 12 of FIG. 1) that controls the playback of advertisements on user devices 210 and/or public advertisement devices 220. For example, the advertisement playback and management device 240 may receive user activity data from user presence and activity sensors 230, determine a duration of time for which a user is actively viewing an advertisement based on the user activity data, and continue playback the advertisement on other devices until the user has actively viewed the advertisement for a target threshold period of time (e.g., a target impression time). The advertisement playback and management device 240 may perform other processes as described herein. For example, the advertisement playback and management device 240 may identify a particular user based on receiving user information as discussed above.

The network 250 may include network nodes, such as network nodes 10 of FIG. 2. Additionally, or alternatively, the network 250 may include one or more wired and/or wireless networks. For example, the network 250 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 250 may include a local area network (LAN), a wide area network (WAN), a metropolitan network (MAN), the Public Switched Telephone Network (PSTN), an advertisement hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Also, in some implementations, one or more of the devices of the environment 500 may perform one or more functions described as being performed by another one or more of the devices of the environment 500. Devices of the environment 500 may interconnect via wired connections, wireless connections, or a combination of wired and wireless connections.

Figure 6:
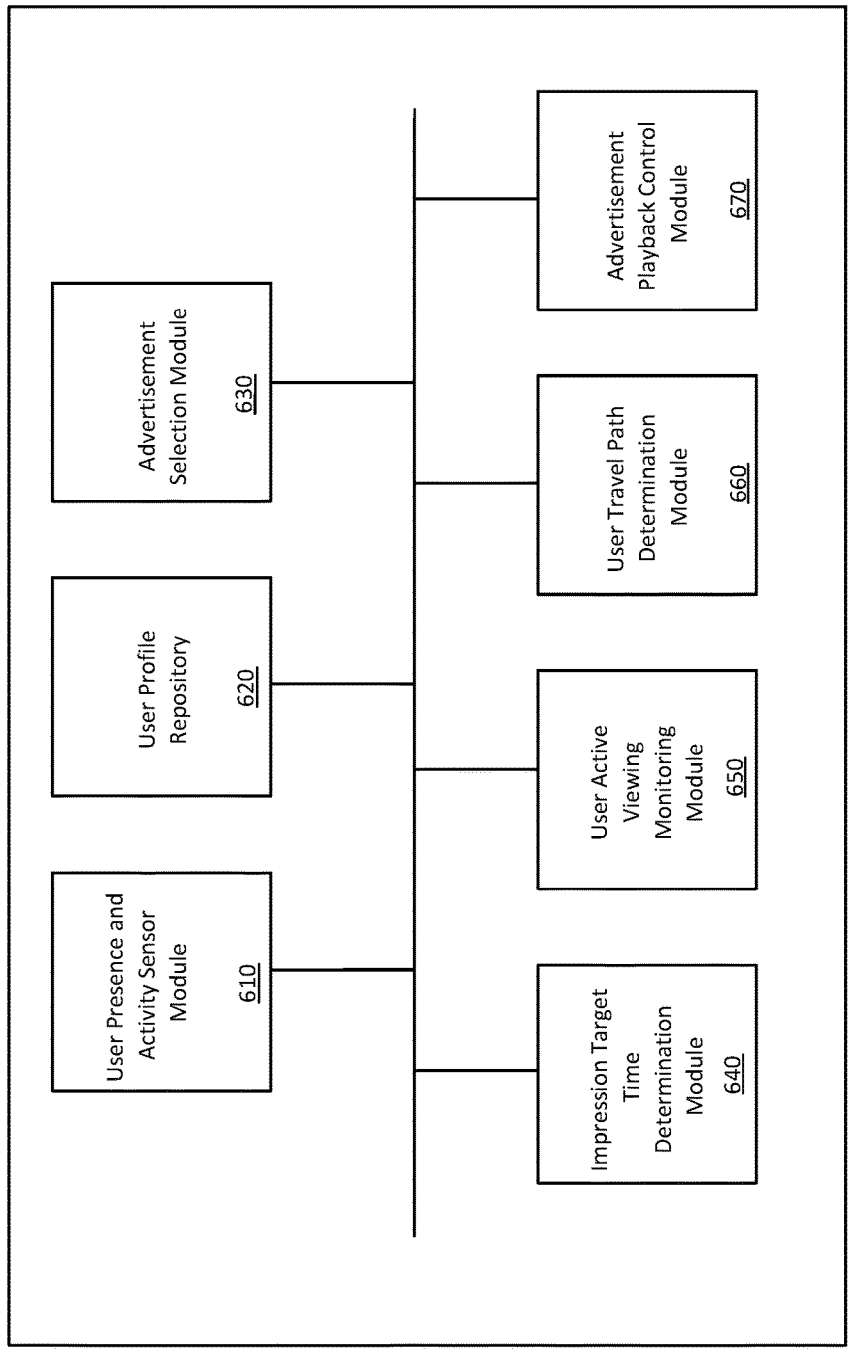
FIG. 6 shows a block diagram of example components of an advertisement playback and management device in accordance with aspects of the present invention.

FIG. 6 shows a block diagram of example components of an advertisement playback and management device 240 in accordance with aspects of the present invention. As shown in FIG. 6, the advertisement playback and management device 240 may include a user presence and activity sensor module 610, a user profile repository 620, a advertisement selection module 630, a impression target time determination module 640, a user active viewing monitoring module 650, a user travel path determination module 660, and a advertisement playback control module 670. In embodiments, the advertisement playback and management device 240 may include additional or fewer components than those shown in FIG. 6. In embodiments, separate components may be integrated into a single computing component or module. Additionally, or alternatively, a single component may be implemented as multiple computing components or modules.

The user presence and activity sensor module 610 may include a program module (program module 42 of FIG. 1) that receives user presence and activity data from one or more user presence and activity sensors 230. In embodiments, the user presence and activity sensor module 610 may also receive user presence information (e.g., user location information) from a user device 210. The user presence and activity sensor module 610 may receive the user presence and activity data when a user is within sensor range of the user presence and activity sensors 230 (e.g., when the user is near a public advertisement device 220 and/or other location implementing the user presence and activity sensors 230). Additionally, or alternatively, the user presence and activity sensor module 610 may receive the user presence and activity data at any other time. In embodiments, the user presence and activity sensor module 610 may receive information identifying a user from the user presence and activity sensors 230 and/or from the user device 210. For example, when the user is within sensor/communications range of the user presence and activity sensors 230, the user device 210 may provide user information to the user presence and activity sensors 230 which may then provide the user information to the user presence and activity sensor module 610. Additionally, or alternatively, the user device 210 may provide the user information to the user presence and activity sensor module 610 based on detecting a user presence and activity sensor 230.

The user profile repository 620 may include a data storage device (e.g., storage system 34 of FIG. 1) that stores user profile information for users based on user identification information. In embodiments, the user profile repository 620 may store user interest information based on user shopping history, interests identified in a user's social media or publically shared profile, etc. Additionally, or alternatively, the user profile may store information indicating user interest levels/attention levels for various types of advertisements. In embodiments, the attention levels may be information obtained over a period of time (e.g., by monitoring the user's active viewing durations/activity as an advertisement or genre of advertisement is played). As described herein, the user profile information may be used to select a targeted advertisement for presenting to the user.

The advertisement selection module 630 may include a program module (program module 42 of FIG. 1) that selects an advertisement to present to a user (e.g., based on identification information for the user as obtained by the user presence and activity sensor module 610, and the user's profile as stored by the user profile repository 620). In embodiments, the advertisement selection module 630 may select an advertisement based on most popular subjects of interest in a group or cluster of users that are located within a viewing proximity of a public advertisement device 220. In embodiments, the advertisement selection module 630 may direct the advertisement playback control module 670 to begin playback of the advertisement on a particular device (e.g., a user device 210 and/or a public advertisement device 220).

The impression target time determination module 640 may include a program module (program module 42 of FIG. 1) that determines an impression target time for an advertisement. In embodiments, the impression target time determination module 640 may receive a predefined impression target time from an administrator or owner of an advertisement. Additionally, or alternatively, the impression target time determination module 640 may determine an individualized impression target time for a user based on an interest level for the user (as determined based on the user profile), the user's real-time attention and/or historical attention of the advertisement (or a similar advertisement in a similar genre), etc.

The user active viewing monitoring module 650 may include a program module (program module 42 of FIG. 1) that monitors the time periods in which a user is actively viewing an advertisement. For example, the user active viewing monitoring module 650 may monitor the user presence and activity information obtained by the user presence and activity sensor module 610. The user active viewing monitoring module 650 may determine that a user is actively viewing the advertisement when the advertisement is within the user's field of view, when the user is not actively using another device, when the user is not in a conversation, when the user is a passenger in the vehicle rather than the driver (or when the user is a driver but is stopped at a traffic light), etc.

In embodiments, the user active viewing monitoring module 650 may determine the user's field of view based on imaging data received as part of the user presence and activity data. For example, the user active viewing monitoring module 650 may process the user presence and activity data to determine an angle in which the user is facing. As a specific, non-limiting example, the user active viewing monitoring module 650 may determine that the user is facing an advertisement when the advertisement is playing on a public advertisement device 220, when user presence and activity sensors 230 with cameras are implemented on the public advertisement devices 220, and when video captured by the camera shows the user looking at the public advertisement device 220. In embodiments, the user active viewing monitoring module 650 may be in communication with the user devices 210 of the user to determine whether the user is using their user device 210 (and thus not paying attention to the advertisement) while the advertisement is playing.

In embodiments, the user active viewing monitoring module 650 may determine whether the user is or is not paying attention to the advertisement based on conversational audio recorded by the user presence and activity sensors 230. For example, if the user is speaking during the advertisement, the user active viewing monitoring module 650 may determine that the user may not be paying attention to the advertisement. In embodiments, the user active viewing monitoring module 650 may determine whether or not the user is paying attention to the advertisement as a binary condition. Additionally, or alternatively, the user active viewing monitoring module 650 may determine an attentiveness score representing a degree to which the user pays attention to the advertisement. In embodiments, the user active viewing monitoring module 650 may determine time periods for when the user is actively viewing the advertisement until the user discontinues actively viewing the advertisement.

The user travel path determination module 660 may include a program module (program module 42 of FIG. 1) that determines a user's travel path or user's activities in connection with selecting devices in which to continue the playback of advertisements. For example, the user travel path determination module 660 may determine the user's travel path based on communication with the user's navigation system on a vehicle. Additionally, or alternatively, the user travel path determination module 660 may determine the user's travel path based on the user's electronic calendar information, user's activity such as buying a cold item from a retail store, keeping the item in refrigerator after arriving at home, watching a sports match on a mobile phone while commuting to home and switching to view the match in television etc. or the like.

The advertisement playback control module 670 may include a program module (program module 42 of FIG. 1) that controls the playback of advertisements across public advertisement devices 220 and private user devices 210. The advertisement playback control module 670 may select which devices across which to play the advertisement based on the user's travel path, activities and may also determine a portion of the advertisement to play in each device. For example, the advertisement playback control module 670 may determine that a first public advertisement device 220 (e.g., a first billboard) and a second public advertisement device 220 (e.g., a second billboard) is on the user's travel path. The advertisement playback control module 670 may initially play a portion of the advertisement on the public advertisement device 220, continue playing another portion of the advertisement on another public advertisement device 220, and continue playing another portion on a private user device 210 (e.g., once no more public advertisement devices 220 are present on the user's travel path). Further, the advertisement playback control module 670 may continue to play the advertisement until an impression target time has been satisfied (e.g., based on information indicating the duration of active viewing of the advertisement as determined by the user active viewing monitoring module 650, and based on the impression target time as determined by the impression target time determination module 640). In this way, an advertisement may "follow" the user such that the advertisement is played until a target threshold time is met (e.g., until the user has actively viewed the advertisement for a threshold amount of time).

Figure 7A:
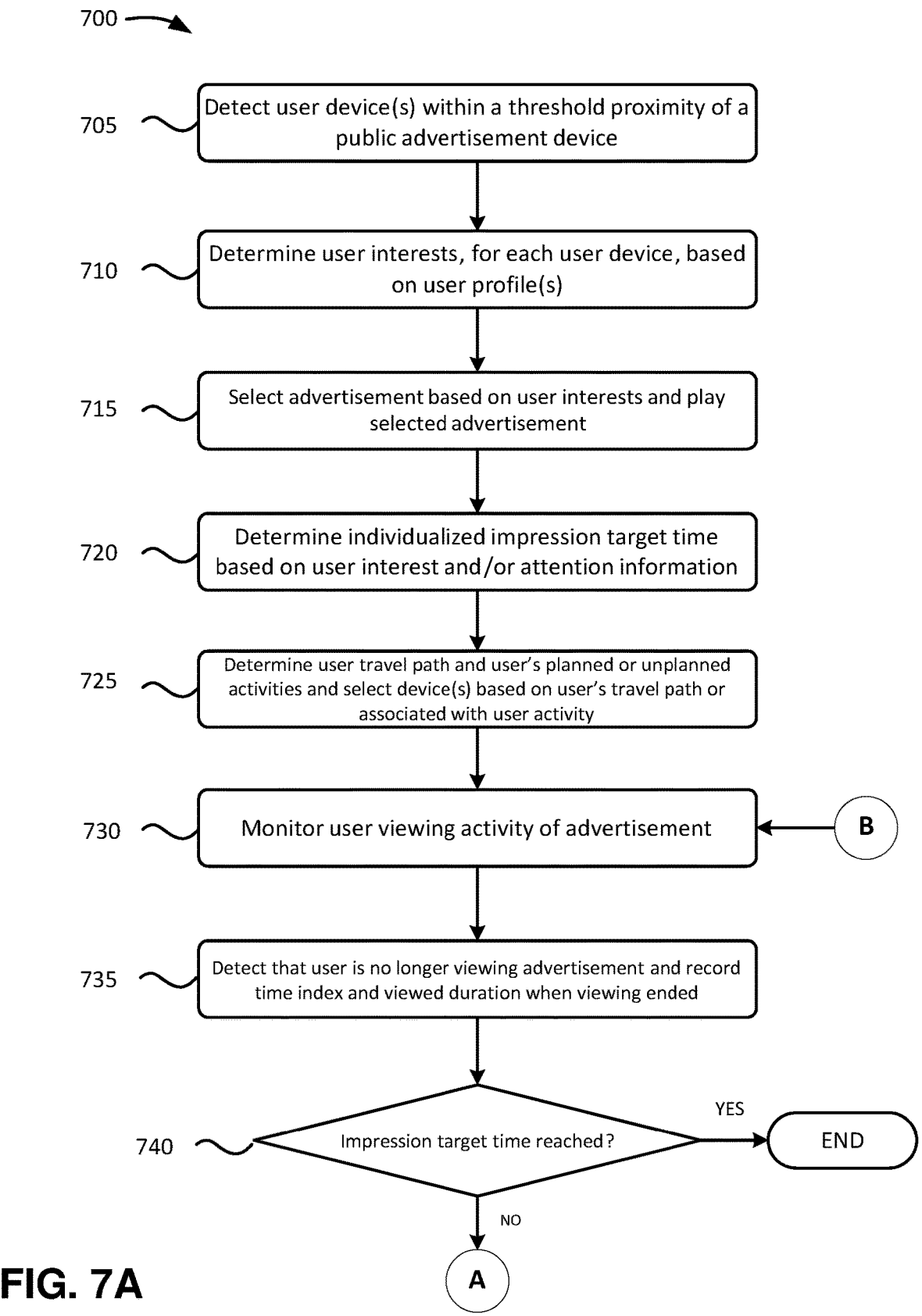
FIGS. 7A and 7B show an example flowchart for monitoring a user's active viewing of an advertisement and playing the advertisement across multiple devices until the user's active viewing duration has satisfied an impression target time in accordance with aspects of the present invention.
Figure 7B:
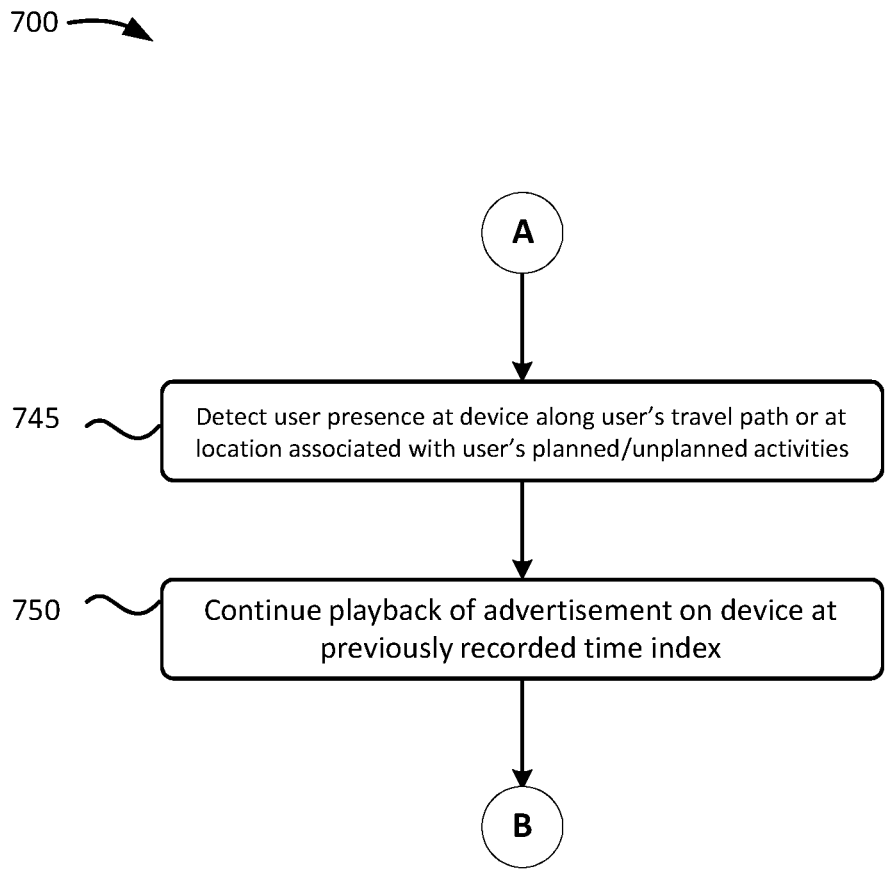

FIGS. 7A and 7B show an example flowchart of a process 700 for monitoring a user's active viewing of an advertisement and playing the advertisement across multiple devices until the user's active viewing duration has satisfied an impression target time. The steps of FIGS. 7A and 7B may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

As shown in FIG. 7A, process 700 may include detecting user device(s) within a threshold proximity of a public advertisement device 220 (step 705). For example, the advertisement playback and management device 240 may detect one or more user devices 210 within a threshold proximity of a public advertisement device 220 (e.g., when the user devices 210 enter to within a sensor/communications range). Further, advertisement playback and management device 240 may obtain user identification information as described above with respect to the user presence and activity sensor module 610. As an example, the advertisement playback and management device 240 may detect one or more user devices 210 when approaching a road side billboard (e.g., at a traffic light). As another example, the advertisement playback and management device 240 may detect one more user devices 210 when approaching a different public advertisement device 220 (e.g., a stationary billboard at a merchant facility, venue, etc.).

Process 700 may further include determining user interests, for each user device 210, based on user profile(s) (step 710). For example, advertisement playback and management device 240 may determine user interests based on user identifiers obtained when detecting the user device(s) 210 at step 705 and based on information stored by the user profile repository 620. If multiple user devices 210 are detected at step 710, the advertisement playback and management device 240 may obtain multiple user profiles form the user profile repository 620.

Process 700 may also include selecting an advertisement based on the user interests and playing the selected advertisement (step 715). For example, as described above with respect to the advertisement selection module 630, the advertisement playback and management device 240 may selects an advertisement to present to a user (e.g., based on identification information for the user as obtained by the user presence and activity sensor module 610, and the user's profile as stored by the user profile repository 620). In embodiments, the advertisement playback and management device 240 may select an advertisement based on most popular subjects of interest in a group or cluster of users that are located within a viewing proximity of a public advertisement device 220. In embodiments, the advertisement playback and management device 240 may begin playback of the advertisement (e.g., on the public advertisement device 220 corresponding to where the one or more user devices 210 were detected in step 705).

Process 700 may further include determining individualized impression target durations based on user interest and/or attention information (step 720). For example, for each user device 210 detected (e.g., at step 705), and as described above with respect to the impression target time determination module 640, the advertisement playback and management device 240 may determine an impression target time for an advertisement. In embodiments, the impression target time determination module 640 may receive a predefined impression target time from an administrator or owner of an advertisement. Additionally, or alternatively, the advertisement playback and management device 240 may determine an individualized impression target time for a user based on an interest level for the user (as determined based on the user profile), the user's real-time attention and/or historical attention information of the advertisement (or a similar advertisement in a similar genre), etc.

Process 700 may also include determining a user's travel path or the user's planned or unplanned activities and selecting device(s) based on the user's travel path, planned, or unplanned activities (step 725). For example, as described above with respect to the user travel path determination module 660 and advertisement playback control module 670, the advertisement playback and management device 240 may determine a user's travel path in connection with selecting devices with which to continue the playback of advertisements. For example, the advertisement playback and management device 240 may determine the user's travel path/planned or unplanned activities based on communication with the user's navigation system on a vehicle. Additionally, or alternatively, the advertisement playback and management device 240 may determine the user's travel path based on the user's electronic calendar information, or the like. The advertisement playback and management device 240 may select which devices across which to play the advertisement based on the user's travel path, and may also determine a portion of the advertisement to play at each device.

Process 700 may further include monitoring the user's viewing activity of the advertisement (step 730). For example, as described above with respect to the user active viewing monitoring module 650, the advertisement playback and management device 240 may monitor the time periods for which a user is actively viewing an advertisement. For example, the advertisement playback and management device 240 may monitor the user presence and activity information obtained by the user presence and activity sensor module 610. The advertisement playback and management device 240 may determine that a user is actively viewing the advertisement when the advertisement is within the user's field of view, when the user is not actively using another device, when the user is not in a conversation, when the user is a passenger in the vehicle rather than the driver (or when the user is a driver but is stopped at a traffic light), etc. In embodiments, the advertisement playback and management device 240 may determine whether or not the user is paying attention to the advertisement as a binary condition. Additionally, or alternatively, the advertisement playback and management device 240 may determine an attentiveness score representing a degree to which the user pays attention to the advertisement. In embodiments, the advertisement playback and management device 240 may determine and record a time index corresponding to a time when the user begins to actively view the advertisement.

Process 700 may also include detecting the user is no longer viewing the advertisement and recording a time index and viewed duration when viewing ended (step 735). For example, as described above with respect to the user travel path determination module 660, the advertisement playback and management device 240 may detect that the user is no longer actively viewing the advertisement based on monitoring the user's viewing activity (e.g., when the user discontinues watching the advertisement). The advertisement playback and management device 240 may record a time index identifying when the active viewing ended. The advertisement playback and management device 240 may also determine a viewing duration corresponding to the time index when the user began actively viewing the advertisement to the time index when the user discontinued actively viewing the advertisement. The advertisement playback and management device 240 may also store a time index for a playback time when viewing ended (e.g., so that playback may be later resumed at that time index on a subsequent device, as described in greater detail below).

Process 700 may further include determining whether the impression target time has been reached (step 740). For example, the advertisement playback and management device 240 may compare the viewed time with the impression target time (e.g., as determined in step 720). If the impression target time has been reached (step 740-YES), process 700 may end, as the user has viewed the advertisement for as long as specified by the impression target time. If, on the other hand, the impression target time has not been reached (step 740-NO), process 700 may continue to point A, which continues to FIG. 7B.

Referring to FIG. 7B, process 700 may also include detecting user presence at a device along the user's travel path or at a location associated with the user's planned/unplanned activities (step 745). For example, the advertisement playback and management device 240 may detect the presence of the user (e.g., of the user's user device 210) at a device along the user's travel path (e.g., a device selected at step 725). In embodiments, the advertisement playback and management device 240 may detect the presence of the user device 210 using user presence and activity sensors 230 implemented at the location of the device along the user's travel path. If the device is a private user device 210, the private user device 210 may detect the user's presence (e.g., from communicating with another user device 210 and/or by receiving user input).

Process 700 may further include continuing playback of the advertisement on the device at a previously record time index (step 750). For example, the advertisement playback and management device 240 provide the advertisement to the device (e.g., the public advertisement device 220 or the user device 210) for playback at the previously recorded time index (e.g., as previously recorded at step 735). In this way, the advertisement may "follow" the user and continue to be played along the user's travel path.

Process 700 may return to point B (e.g., step 730 in FIG. 7A) in which the user's viewing activity of the advertisement is monitored. Process 700 may continue, as described above, such that the advertisement continues to play on subsequent devices until an impression target time as been reached. That is, the advertisement playback and management device 240 may determine a first viewed duration of time in which a user has actively viewed the advertisement on the a first device (e.g., based on the monitoring at step 730), present the advertisement on a second device on condition that the first time period is less than an impression target time (e.g., at step 750), determine a second viewed duration of time in which a user has actively viewed the advertisement on the second device (based on the monitoring at step 730), present the advertisement on a third device (e.g., at step 750) on condition that a sum of the first view duration of time and the second viewed duration of time is less than the impression target time. Further, the advertisement playback and management device 240 may continue displaying the advertisement on additional devices until a total viewed duration of time at least equals the impression time target.

In embodiments, process 700 may be modified in the event that a user is detected after an advertisement has already been selected and has already begun playing. In this case, process 700 may begin at step 720. Also, selecting of the advertisement to play may not be needed as described in steps 705-715. For example, the advertisement playback and management device 240 may present any advertisement (e.g., from a library of advertisements), in which case process 700 may begin at step 720 without the need for advertisement playback and management device 240 to detect user devices 210 within a proximity of a public advertisement device 220, and without the need to determine user interests and select a corresponding advertisement. Additionally, or alternatively, process 700 may apply when an advertisement initially begins being played on a private user device 210 rather than a public advertisement device 220. In embodiments, the steps of process 700 may occur in a different order than shown in FIGS. 7A and 7B. For example, step 715 may occur after step 725 such that a selection of an advertisement may be based on the user's travel path, and a version of the advertisement with a duration matching that of the impression target time is selected.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
presenting, by a computing device, an advertisement on a first device;
monitoring, by the computing device, viewing activity by a user of the advertisement, wherein the monitoring comprises tracking an amount of time that the user actively views the advertisement on the first device and determining a time when the user stops actively viewing the advertisement;
determining, by the computing device, a time index of the advertisement at the time when the user stops actively viewing the advertisement;
initiating, by the computing device, playback of the advertisement on a second device, wherein the presenting the advertisement is resumed at the time index of the advertisement; and
continuing, by the computing device, playback of the advertisement on the second device or subsequent devices until the user has actively viewed the advertisement for a target impression time based on the monitoring.

2. The method of claim 1, wherein the tracking includes determining that the user actively views the advertisement based on user activity data representing the viewing activity.

3. The method of claim 2, wherein the user activity data includes at least one selected from a group consisting of:
user device activity data;
user field of view data;
user speech data.

4. The method of claim 3, wherein the user activity data is reported by one or more user presence and activity sensors.

5. The method of claim 3, wherein determining that the user actively views the advertisement includes at least one selected from a group consisting of:
determining, by the computing device, that the user is a passenger in a vehicle and not a driver of the vehicle;
determining, by the computing device, that the user is a driver of the vehicle but the vehicle is stopped;
determining, by the computing device, that the user device activity indicates that the user is not using a user device during the presentation of the advertisement; and
determining, by the computing device, that the user speech data indicates that the user is not speaking during the advertisement.

6. The method of claim 1, further comprising:
detecting that the user is no longer actively viewing the advertisement; and
determining that a duration between when the user actively viewed the advertisement and the detecting that the user no longer actively viewed the advertisement does not satisfy the impression target time,
wherein the continuing the playback is based on the determining that the duration does not satisfy the impression target time.

7. The method of claim 1, further comprising:
determining, by the computing device, the user's travel path, or the user's planned or unplanned activities; and
selecting, by the computing device, the second device for the playback of the advertisement based on the user's travel path, wherein the second device is on the user's travel path or at a location associated with user's planned or unplanned activities.

8. The method of claim 1, wherein at least one of the first device and the second device include a public billboard.

9. The method of claim 1, further comprising selecting the advertisement based on user interests of the user or user interest of one or more other users within a viewing proximity of the advertisement, wherein the presenting the advertisement is based on selecting the advertisement.

10. The method of claim 1, wherein a service provider at least one of creates, maintains, deploys and supports the computing device.

11. The method of claim 1, wherein the presenting the advertisement, the monitoring the viewing activity, and the continuing the playback are provided by a service provider on a subscription, advertising, and/or fee basis.

12. The method of claim 1, wherein the computing device includes software provided as a service in a cloud environment.

13. The method of claim 1, further comprising deploying a system for continuing to play the advertisement based on monitoring the user's attention to the playback of the advertisement, comprising providing a computer infrastructure operable to perform the presenting the advertisement, the monitoring the viewing activity, and the continuing the playback.

14. A computer program product for playing back an advertisement for a user across a plurality of devices, the computer program product comprising a computer readable storage medium having program instructions embodied therewith, the program instructions executable by a computing device to cause the computing device to:

present an advertisement on a first device to a user;
determine a first time index of the advertisement corresponding to when the user begins actively viewing the advertisement on the first device;
determine a second time index of the advertisement corresponding to when the user discontinues actively viewing the advertisement on the first device;
determine a viewing time corresponding to a duration of time between the first time index and the second time index; and
continue playback of the advertisement on a second device based on determining that the viewing time is less than a target impression time, wherein the playback of the advertisement is resumed at the second time index of the advertisement corresponding to when the user discontinues actively viewing the advertisement.

15. The computer program product of claim 14, wherein:
the determining the first time index comprises detecting that the user begins actively viewing the advertisement based on user activity data representing the user's activity,
the determining the second time index comprises detecting that the user discontinues actively viewing the advertisement based on the user activity data representing the user's activity.

16. The computer program product of claim 15, wherein the user activity data is reported by one or more user presence and activity sensors, and wherein the user activity data included at least one selected from a group consisting of:
user device activity data;
user field of view data;
user speech data.

17. The computer program product of claim 16, wherein the program instructions further cause the computing device to:
determine the user's travel path, or the user's planned or unplanned activities; and
select the second device for the playback of the advertisement based on the user's travel path, wherein the second device is on the user's travel path or at a location associated with user's planned or unplanned activities.

18. The computer program product of claim 16, wherein the detecting that the user actively views the advertisement includes at least one selected from a group consisting of:

determining that the user is a passenger in a vehicle and not a driver of the vehicle;
determining that the user is a driver of the vehicle but the vehicle is stopped;
determining that the user device activity indicates that the user is not using a user device during the presentation of the advertisement; and
determining that the user speech data indicates that the user is not speaking during the advertisement.

19. A system comprising:
a CPU, a computer readable memory and a computer readable storage medium associated with a computing device;
program instructions to present an advertisement on a first device;
program instructions to determine a first time when the user stops actively viewing the advertisement;
program instructions to determine a first time index of the advertisement at the first time when the user stops actively viewing the advertisement;
program instructions to determine a first viewed duration of time in which a user has actively viewed the advertisement on the first device;
program instructions to present the advertisement on a second device based on the first time period being less than an impression target time, wherein the presenting the advertisement comprises resuming playback of the advertisement at the first time index of the advertisement;
program instructions to determine a second time when the user stops actively viewing the advertisement;
program instructions to determine a second time index of the advertisement at the second time when the user stops actively viewing the advertisement;
program instructions to determine a second viewed duration of time in which a user has actively viewed the advertisement on the second device; and
program instructions to present the advertisement on a third device based on a sum of the first view duration of time and the second viewed duration of time being less than the impression target time, wherein the presenting the advertisement comprises resuming playback of the advertisement at the second time index of the advertisement,
wherein the program instructions are stored on the computer readable storage medium for execution by the CPU via the computer readable memory.

20. The system of claim 19, further comprising program instructions to continue displaying the advertisement on additional devices until a total viewed duration of time is equal to or greater than the impression time target.

* * * * *